US011943841B2

(12) United States Patent
Krannawitter et al.

(10) Patent No.: US 11,943,841 B2
(45) Date of Patent: Mar. 26, 2024

(54) TRANSMISSION CONTROL PROTOCOL (TCP) CONTROL OVER RADIO COMMUNICATIONS

(71) Applicant: T-MOBILE INNOVATIONS LLC, Overland Park, KS (US)

(72) Inventors: Aaron M. Krannawitter, Olathe, KS (US); Christopher Bailey, Overland Park, KS (US); Richard Aaron Reiser, Overland Park, KS (US); Michael Lance Shelby, Shawnee, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 17/888,284

(22) Filed: Aug. 15, 2022

(65) Prior Publication Data

US 2022/0394816 A1 Dec. 8, 2022

Related U.S. Application Data

(63) Continuation of application No. 16/694,792, filed on Nov. 25, 2019, now Pat. No. 11,445,570.

(51) Int. Cl.
*H04W 80/06* (2009.01)
*H04B 17/318* (2015.01)
*H04L 1/1867* (2023.01)
*H04W 4/029* (2018.01)
*H04W 4/80* (2018.01)

(52) U.S. Cl.
CPC .......... *H04W 80/06* (2013.01); *H04B 17/318* (2015.01); *H04L 1/189* (2013.01); *H04W 4/029* (2018.02); *H04W 4/80* (2018.02)

(58) Field of Classification Search
CPC ........ H04W 4/029; H04W 4/80; H04W 80/06
USPC ....... 370/329, 254, 252, 328, 229, 469, 331, 370/216, 335, 332, 462, 351, 248
See application file for complete search history.

(56) References Cited

U.S. PATENT DOCUMENTS

| 6,272,148 | B1 | 8/2001 | Takagi et al. |
| 6,757,245 | B1 | 6/2004 | Kuusinen et al. |
| 6,826,153 | B1 | 11/2004 | Kroon |
| 8,346,315 | B2 | 1/2013 | Lindoff et al. |
| 8,417,242 | B2 | 4/2013 | Cormier et al. |
| 9,001,682 | B2 | 4/2015 | Kovvali et al. |

(Continued)

FOREIGN PATENT DOCUMENTS

| WO | 2014134407 A1 | 9/2014 |
| WO | 2017099828 A1 | 6/2017 |

*Primary Examiner* — Joseph Arevalo

(57) ABSTRACT

In User Equipment (UE) at various geographic locations, circuitry exchanges TCP packets with radios, and the radios wirelessly exchange the TCP packets with wireless communication nodes. The circuitry determines TCP retransmission rates for the radios at the geographic locations. The circuitry estimates TCP retransmission rates for the radios at a new geographic location based on the TCP retransmission rates for the radios at the past geographic locations. The circuitry selects one of the radios based on the estimated TCP retransmission rates at the new geographic location. At the new geographic location, the circuitry exchanges new TCP packets with the selected one of the radios, and the selected one of the radios wirelessly exchanges the new TCP packets with one of the wireless communication nodes.

20 Claims, 6 Drawing Sheets

(56) References Cited

U.S. PATENT DOCUMENTS

| | | |
|---|---|---|
| 9,380,635 B2 | 6/2016 | Chisu et al. |
| 9,706,522 B2 | 7/2017 | Etemad et al. |
| 9,712,289 B2 | 7/2017 | Jorgensen |
| 9,967,727 B2 | 5/2018 | Gupta et al. |
| 10,419,170 B2 | 9/2019 | Meylan et al. |
| 10,527,449 B2* | 1/2020 | West ............ G08G 1/0116 |
| 10,897,498 B1 | 1/2021 | Paczkowski et al. |
| 2004/0058652 A1* | 3/2004 | McGregor ............ H04B 17/24 |
| | | 455/423 |
| 2005/0163047 A1* | 7/2005 | McGregor ............ H04W 24/00 |
| | | 370/229 |
| 2006/0046736 A1 | 3/2006 | Pering et al. |
| 2010/0029275 A1 | 2/2010 | Bosch et al. |
| 2011/0201295 A1 | 8/2011 | Ma et al. |
| 2013/0100830 A1 | 4/2013 | Brady et al. |
| 2013/0204698 A1* | 8/2013 | Bryant ............ G06Q 30/0601 |
| | | 705/14.51 |
| 2015/0206072 A1* | 7/2015 | Fabris ............ G06Q 10/02 |
| | | 705/5 |
| 2015/0271690 A1 | 9/2015 | Vashi et al. |
| 2017/0118715 A1 | 4/2017 | Bhattacharya et al. |
| 2017/0237673 A1 | 8/2017 | Law |
| 2018/0159230 A1 | 6/2018 | Henry et al. |
| 2019/0007115 A1 | 1/2019 | Luong et al. |
| 2019/0339687 A1* | 11/2019 | Cella ............ H04W 4/70 |
| 2019/0364492 A1* | 11/2019 | Azizi ............ H04W 48/16 |
| 2020/0169955 A1* | 5/2020 | Chang ............ H04W 72/042 |
| 2020/0195703 A1 | 6/2020 | Sawabe et al. |
| 2021/0044529 A1 | 2/2021 | Salem et al. |

\* cited by examiner

TRANSMISSION CONTROL PROTOCOL (TCP) CONTROL OVER RADIO COMMUNICATIONS

RELATED CASES

This United States Patent Application is a continuation of U.S. patent application Ser. No. 16/694,792 that was filed on Nov. 25, 2019 and is entitled "TRANSMISSION CONTROL PROTOCOL (TCP) CONTROL OVER RADIO COMMUNICATIONS." U.S. patent application Ser. No. 16/694,792 is hereby incorporated by reference into this United States Patent Application.

TECHNICAL BACKGROUND

Wireless communication networks provide wireless data services to wireless user devices. Exemplary wireless data services include machine-control, internet-access, and media-streaming. Exemplary wireless user devices comprise phones, computers, vehicles, robots, and sensors. The wireless communication networks have wireless access nodes that exchange wireless signals with the wireless user devices using wireless network protocols. Exemplary wireless network protocols include Bluetooth (BT), Institute of Electrical and Electronic Engineers (IEEE) 802.11 (WIFI), Long Term Evolution (LTE), Fifth Generation New Radio (5GNR), and Low-Power Wide Area Network (LP-WAN). Some of the wireless user devices can use multiple network protocols. For example, a smartphone typically has different radios for LTE, WIFI, 5GNR, BT, and Global Positioning System (GPS).

The wireless communications networks transport signals that carry Internet Protocol (IP) packets. The IP packets feature a header with network addressing and a payload with user data. IP does not guarantee delivery of the IP packets. Transmission Control Protocol (TCP) was developed to guarantee delivery for IP. The TCP transmitter adds sequence numbers to the TCP/IP packets that it sends to the TCP receiver. The TCP receiver processes the sequence numbers and returns acknowledgements to the TCP transmitter when the proper TCP packets are received. The TCP transmitter retransmits a TCP packet if the transmitter does not receive a timely acknowledgement from the TCP receiver. The TCP receiver requests missing TCP packets from the TCP transmitter to fill any gaps in the sequence numbers, and the TCP transmitter retransmits the missing TCP packets. The TCP receiver requests an accurate TCP packet from the TCP transmitter when a received packet fails a parity check, and the TCP transmitter retransmits the faulty TCP packet.

Unfortunately, the wireless user devices do not efficiently and effectively use TCP to optimize the use of different radios.

TECHNICAL OVERVIEW

In User Equipment (UE) at various geographic locations, circuitry exchanges TCP packets with radios, and the radios wirelessly exchange the TCP packets with wireless communication nodes. The circuitry determines TCP retransmission rates for the radios at the geographic locations. The circuitry estimates TCP retransmission rates for the radios at a new geographic location based on the TCP retransmission rates for the radios at the past geographic locations. The circuitry selects one of the radios based on the estimated TCP retransmission rates at the new geographic location. At the new geographic location, the circuitry exchanges new TCP packets with the selected one of the radios, and the selected one of the radios wirelessly exchanges the new TCP packets with one of the wireless communication nodes.

DETAILED DESCRIPTION

Figure 1:
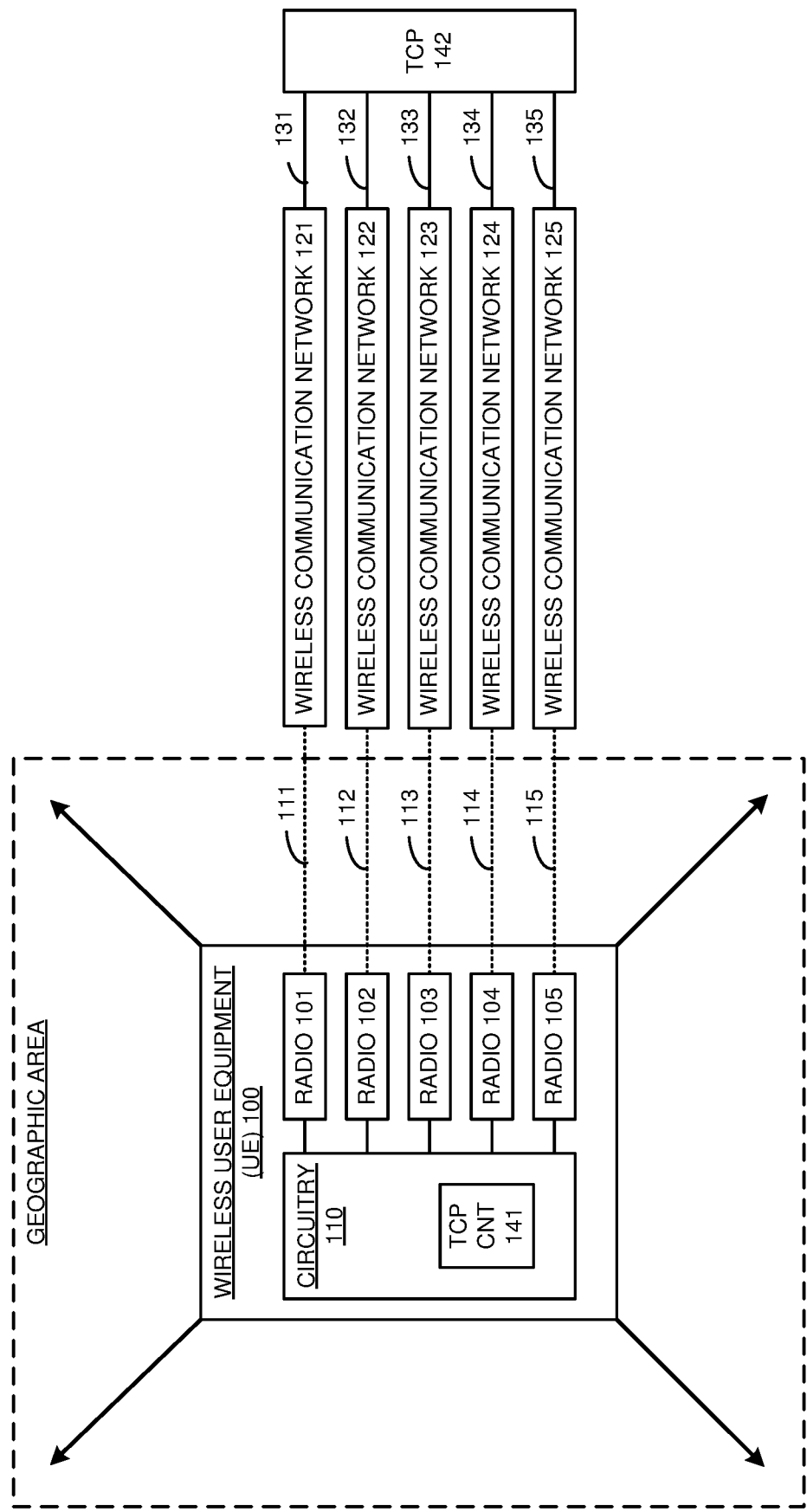
FIG. 1 illustrates wireless User Equipment (UE) that uses Transmission Control Protocol (TCP) to deliver mobile data services and control radios.

FIG. 1 illustrates wireless User Equipment (UE) 100 that uses Transmission Control Protocol (TCP) controller 141 to deliver mobile data services and control radios 101-105. The mobile data services comprises messaging, machine-control, and the like. In some examples, wireless UE 100 comprises a wearable device like a watch, armband, headgear, clothing, or footwear. In UE 100, circuitry 110 hosts TCP controller (CNT) 141. Circuitry 110 is coupled to radios 101-105. Under the control of circuitry 110, radios 101-105 and wireless communication networks 121-125 communicate over respective wireless links 111-115. Wireless communication networks 121-125 and TCP controller 142 communicate over respective network links 131-135. Thus, TCP controllers 141-142 exchange TCP packets over radios 101-105, links 111-115, networks 121-125, and links 131-135. The TCP packet exchange includes Acknowledgement messages (ACKs), error messages, and packet retransmissions.

Wireless communication networks 121-125 comprise networking equipment that uses Bluetooth (BT), Fifth Generation New Radio (5GNR), Low-Power Wide Area Network (LP-WAN), Long Term Evolution (LTE), Institute of Electrical and Electronic Engineers (IEEE) 802.11 (WIFI), and/or some other type of Radio Access Technologies (RATs). TCP controller 142 is hosted by a computer system that use Internet Protocol (IP). For example, TCP 142 may be hosted by an internet server or smartphone. Wireless links 111-115 use BT, 5GNR, LP-WAN, LTE, WIFI, and/or some other type of RATs. Wireless links 111-115 may use frequencies in the low-band, mid-band, high-band, or some other part of the electromagnetic spectrum. Network links 131-135 may use IEEE 802.3 (Ethernet), Time Division Multiplex (TDM), Data Over Cable System Interface Specification (DOCSIS), Internet Protocol (IP), 5GNR, WIFI, LTE, or some other data communication protocol.

In wireless UE 100, radios 101-105 comprise antennas, amplifiers, filers, modems, analog/digital interfaces, Digital Signal Processors (DSPs), memory, and bus circuitry. Radios 101-105 are coupled to circuitry 110 over bus circuitry or some other data link. Radios 101-105 use BT, 5GNR, LP-WAN, LTE, WIFI, and/or some other type of RATs over wireless links 111-115. Circuitry 110 comprises microprocessor, memory, software, power-supply, and bus circuitry. The microprocessor comprises a Central Processing Unit (CPU), Graphical Processing Unit (GPU), Application-Specific Integrated Circuit (ASIC), DSP and/or the like. The memory comprise Random Access Memory (RAM), flash circuitry, disk drive, and/or the like. The memory stores software like operating system, user applications, and network applications. The network applications include TCP controller 141. The power-supply comprises a battery, solar-cell, power port, and/or some other energy supply for UE 100. In circuitry 110, the microprocessor executes the software to drive radios 101-105 to wirelessly exchange data with wireless communication networks 121-125 over links 111-115.

As indicted by the arrows, wireless UE 100 moves around a geographic area and delivers the mobile data services over radios 101-105 and circuitry 110. The geographic area is for reference and may take on various shapes and sizes. While at a current location in the geographic area, radios 101-105 detect the Received Signal Strength (RSS) from respective wireless communication networks 121-125 over wireless links 111-115. Radios 101-105 transfer the detected RSS information to circuitry 110. Circuitry 110 qualifies individual radios 101-105 that have adequate RSS at the current location. For example, circuitry 110 may compare the RSS for radio 101 to a strength threshold for radio 101 and compare the RSS for radio 102 to a strength threshold for radio 102. Radios 101-105 that exceed their individual RSS thresholds are qualified.

Circuitry 110 then estimates TCP retransmission rates at the current location and time for the qualified radios. To estimate TCP retransmission rates, circuitry 100 tracks past TCP retransmissions by radio, location, and time. Circuitry 110 may then calculate average distance from the current location to the locations of past TCP retransmissions for a qualified radio and then process the average distances and retransmission quantity to estimate the TCP retransmission rate for the qualified radio at the current location. Other clustering techniques could be used to score the proximity of UE 100 to geographic sites that had heavy TCP retransmissions for a given radio at a given time.

Circuitry 110 identifies individual qualified radios that have adequate TCP retransmission rate estimates. For example, circuitry 110 may compare the TCP retransmission rate estimate for radio 103 to a rate threshold for radio 103 and compare the TCP retransmission rate estimate for radio 104 to a rate threshold for radio 104. The qualified radios with rate estimates below their individual retransmission rate thresholds are identified. Circuitry 110 then selects one of these identified radios that consumes the least amount of power. For example, radios 102-104 may be qualified by their RSS, and qualified radios 103-104 may be identified by their retransmission rates. Circuitry 110 may then select radio 103 over radio 104, because radio 103 consumes less power than radio 104.

TCP controller 141 exchanges TCP packets with TCP controller 142 over the selected one of radios 101-105. The selected radio wirelessly exchanges the TCP packets with the corresponding one of wireless networks 121-125 over the corresponding one of wireless links 111-115. The corresponding wireless network exchanges the TCP packets with TCP controller 142 over the corresponding one of network links 131-135. During the TCP packet exchange, TCP controllers 141-142 detect TCP errors and participate in TCP retransmissions. For example, TCP controller 141 may time-out waiting for an ACK and retransfer a TCP packet to TCP control 142. TCP controller 141 may detect missing packets in the sequence and request retransmission of the missing TCP packets from TCP controller 142. TCP controller 142 may detect a checksum failure in a received TCP packet and request retransmission of the corrupt TCP packet from TCP 141. Other triggers for TCP retransmissions could be used.

TCP controller 141 stores the resulting TCP retransmission data for the selected radio, location, and time in circuitry 110. The location may comprise geographic coordinates from satellite system or some other navigation tool. The time may comprise time-of-day, day-of-week, day-of-year, and/or some other time increment. TCP controller 141 stores the TCP retransmission data for the selected radio, location, and time in association with one another. TCP controller 141 subsequently uses the stored TCP retransmission data to estimate TCP retransmission rates.

Some user applications may not be suitable for all radios 101-105. TCP controller 141 may host a data structure that it enters with the currently executing user applications to yield radio selection instructions that may eliminate some radios from selection when serving specific user applications. For clarity, the description herein assumes that all radios 101-105 in UE 100 are suitable for the user applications. In many cases, wireless UE 100 is a very small and low-power wearable that has optimized user applications are for the smaller and lighter form-factor.

Figure 2:
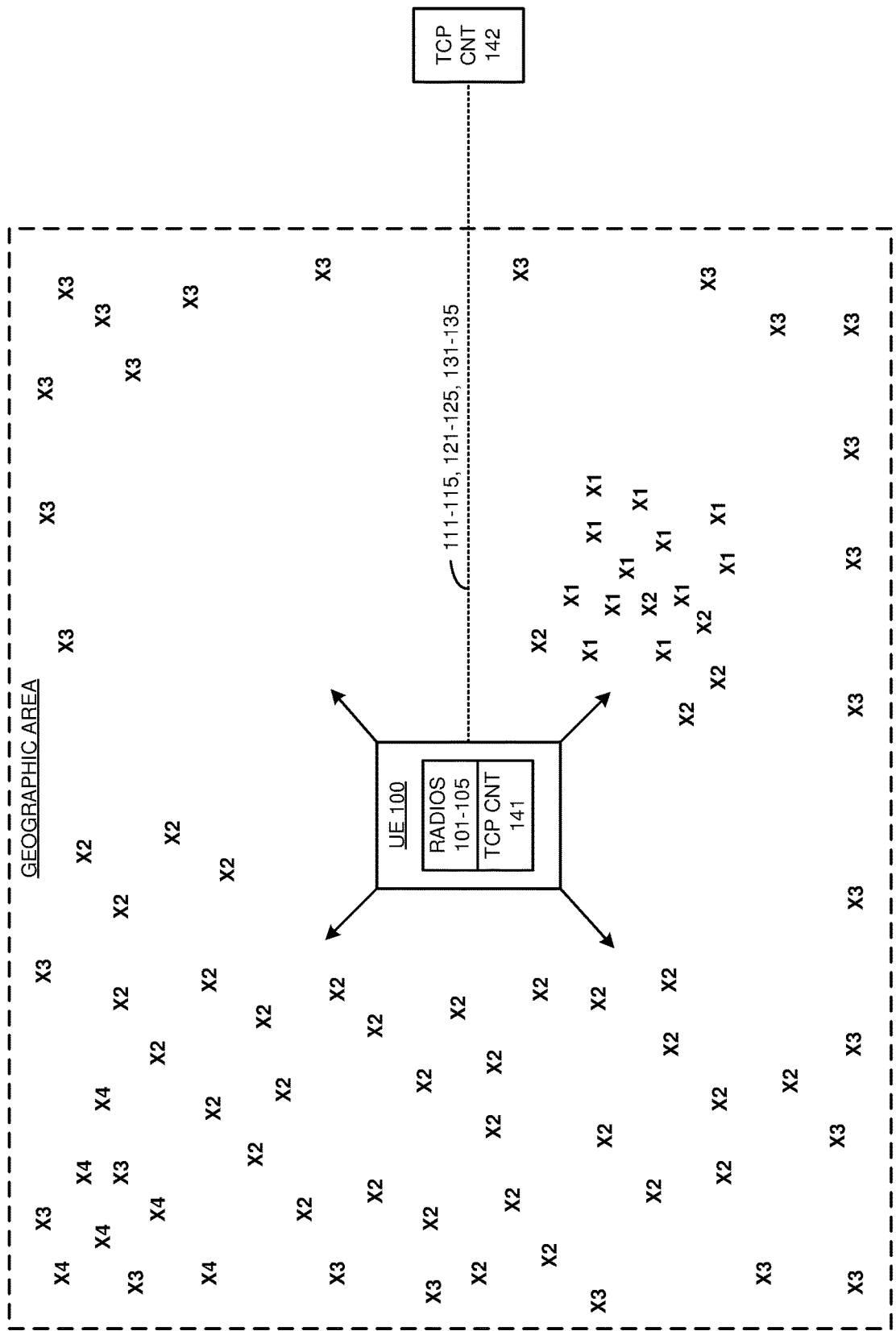
FIG. 2 illustrates the operation of the wireless UE to use TCP to deliver the mobile data services and control the radios.

FIG. 2 illustrates the operation of wireless UE 100 to use TCP controller 141 to deliver the mobile data services and control radios 101-105. As indicted by the arrows, wireless UE 100 moves around the geographic area and delivers the mobile data services using TCP controller 141 and radios 101-105. Circuitry 100 tracks past TCP retransmissions by radio, location, and time. The past TCP retransmissions are indicated on FIG. 2 by an X along with a number that denotes the participating radio. For example, the term "X3" indicates a TCP retransmission at the location to or from radio 103, and the term "X4" indicates a TCP retransmission at the location to or from radio 104. The TCP retransmission tracking is extended to the time domain by developing data like that shown on FIG. 2 for individual time periods (like one-hour) and then maintaining and using the separate data stores for each time period. The TCP retransmission data from other time periods may still be used on a time-weighted basis.

While at various locations in the geographic area, radios 101-105 detect and report their RSS. UE 100 qualifies individual radios 101-105 that have adequate RSS. UE 100 estimates TCP retransmission rates for the qualified radios at the locations and times. To estimate a retransmission rate for an individual qualified radio, UE 100 typically processes the distances from its current location to past locations of TCP retransmissions for that individual qualified radio. UE 100 processes the amount and distance of the past TCP retransmissions for the qualified radios. Newer past TCP retransmissions are often weighted more than older past retransmissions. Past TCP retransmissions that occur at near the current time-of-day and day-of-week may be weighted more than past retransmissions that occur at other times. In some examples, UE 100 individually scores each qualified radio based on their past TCP retransmissions. UE 100 then identifies the qualified radios that should have an acceptable TCP retransmission rate at the current location and time based on the scores. An exemplary TCP retransmission rate estimate might equal the product of "A" divided by the average distance to the retransmissions plus the product of "B" times the total number of retransmissions where A and B are normalizing variables. Other clustering techniques could be used to score the UEs current proximity to past locations having heavy TCP retransmissions for a qualified radio at a given time.

After identifying radios based on the TCP retransmission estimates, UE 100 selects the one of the identified radios that uses the least power. For example, radios 101-104 may be qualified by RSS, and then radios 103-104 may be identified by retransmission rate. UE 100 could then select radio 103 because radio 103 consumes less power than radio 104. TCP controller 141 drives UE 100 to exchange TCP packets with TCP controller 142 over the selected radio. The selected radio wirelessly exchanges the TCP packets with the corresponding one of wireless networks 121-125 over the corresponding one of wireless links 111-115. The corresponding wireless network exchanges the TCP packets with TCP controller 142 over the corresponding one of network links 131-135.

During the TCP packet exchange, TCP controllers 141-142 detect and correct TCP errors which entails TCP retransmissions. For example, TCP controller 142 may time-out waiting for an ACK and retransfer a TCP packet. TCP controller 142 may detect a missing packet and request retransmission of the missing TCP packet from TCP 141. TCP controller 141 may detect a checksum failure in a received packet, and request retransmission of the corrupt TCP packet from TCP 142. TCP controller 141 stores the TCP retransmission data for the selected radio, location, and time. TCP controller 141 subsequently uses the stored TCP retransmission data to estimate TCP retransmission rates.

Figure 3:
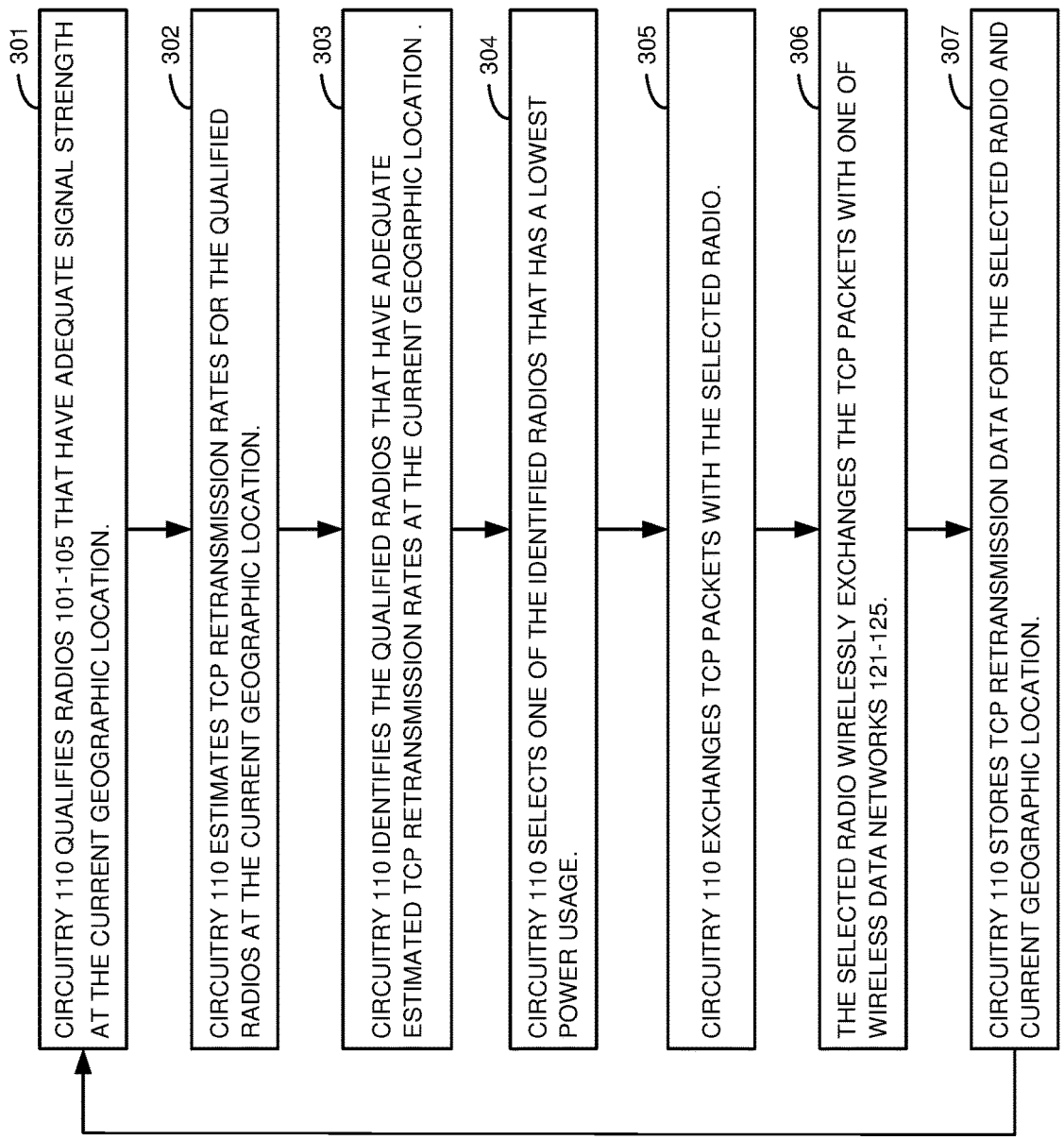
FIG. 3 illustrates the operation of the wireless UE to use TCP to deliver the mobile data services and control the radios.

FIG. 3 illustrates the operation of wireless UE 100 to use TCP controller 141 to deliver the mobile data services and control radios 101-105. In wireless UE 100, circuitry 110 qualifies individual radios 101-105 that have adequate RSS at the current geographic location (301). Circuitry 110 estimates TCP retransmission rates for the qualified radios at the current geographic location (302). To estimate a retransmission rate for a radio, circuitry 110 processes data that characterizes past locations of TCP retransmissions for the radio. Circuitry 110 identifies the qualified radios that should have acceptable TCP retransmission rates at the current location (303). Circuitry 110 selects one of the identified radios that consumes the least power (304). Circuitry 110 may use a power rating for radios 101-105 to compare power consumption or the power supply may transfer actual power usage data. Circuitry 110 exchanges TCP packets the selected radio (305). The selected radio wirelessly exchanges the TCP packets with the corresponding one of wireless networks 121-125 over the corresponding one of wireless links 111-115 (306). Circuitry 110 stores TCP retransmission data for the selected radio and geographic location 307. The operation repeats (301), and circuitry 110 may use the newly stored data to estimate TCP retransmission rates for the selected radio (302).

Figure 4:
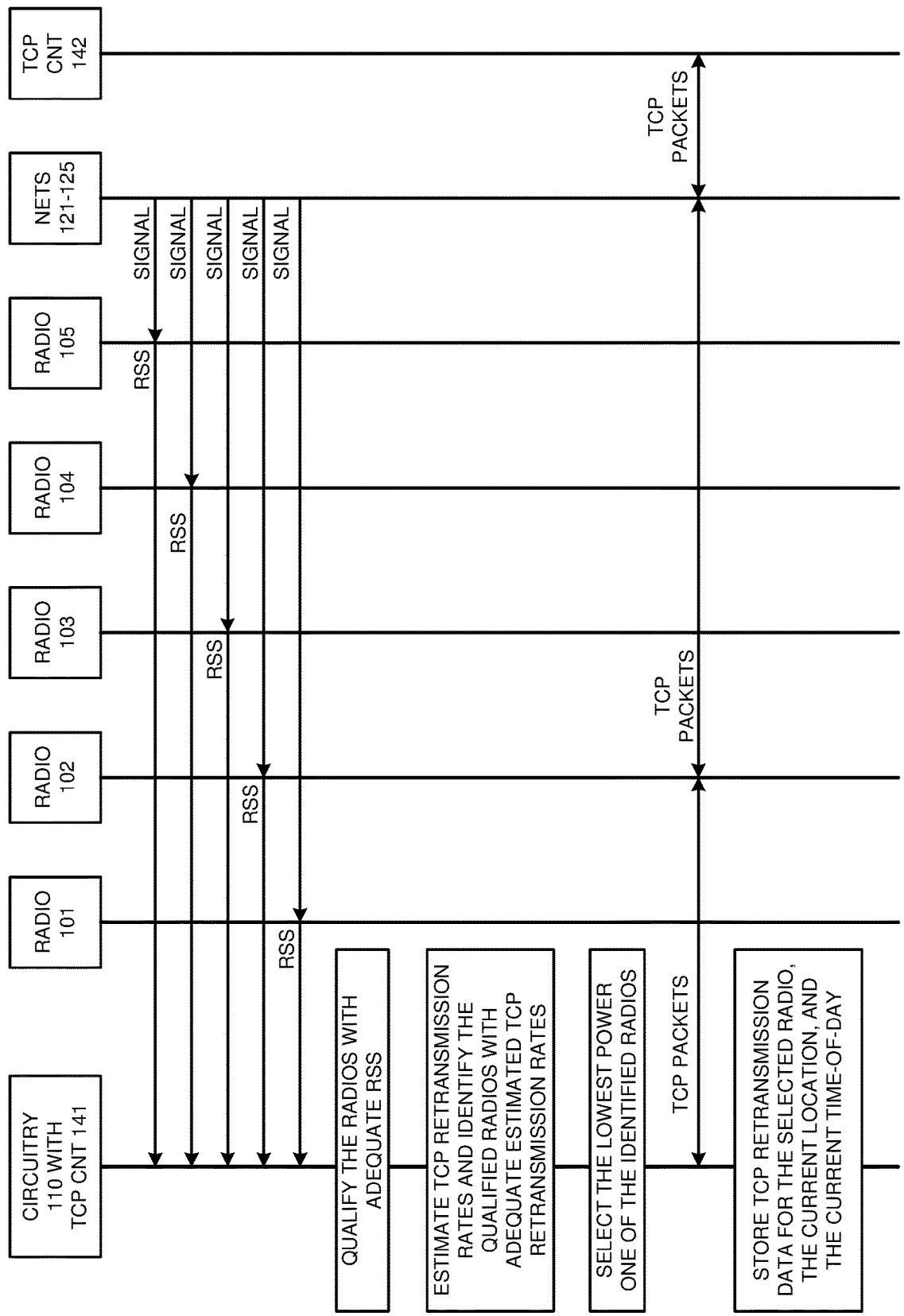
FIG. 4 illustrates the operation of the wireless UE to use TCP to deliver the mobile data services and control the radios.

FIG. 4 illustrates the operation of wireless UE 100 to use TCP controller 141 to deliver the mobile data services and control radios 101-105. Wireless communication networks 111-115 transfer pilot signals for reception by respective radios 101-105. Radios 101-105 receive and process the pilot signals to detect the Received Signal Strength (RSS) from respective wireless communication networks 121-125. Radios 101-105 transfer the detected RSS to circuitry 110. Circuitry 110 executes TCP controller 141 to operate as follows.

Circuitry 110 qualifies individual radios 101-105 that have adequate RSS at the current location. Circuitry 110 then estimates TCP retransmission rates for the qualified radios, the current location, and the current time. Circuitry 110 identifies the qualified radios that have adequate TCP retransmission rate estimates. Circuitry 110 selects one of the identified radios based on least power consumption. Circuitry 110 exchange TCP packets with TCP controller 142 over the selected one of radios 101-105. The selected radio wirelessly exchanges the TCP packets with the corresponding one of wireless networks 121-125, and the corresponding wireless network exchanges the TCP packets with TCP controller 142. During the TCP packet exchange, TCP controllers 141-142 detect TCP errors and participate in TCP retransmissions. Circuitry 110 stores TCP retransmission data for the selected radio, location, and time in association with one another. Circuitry 110 uses the stored TCP retransmission data to estimate TCP retransmission rates for the selected radio.

Advantageously, wireless UE 100 efficiently and effectively uses TCP controller 141 to select radios 101-105 and to deliver mobile data services like messaging and machine communications over the selected radios.

Figure 5:
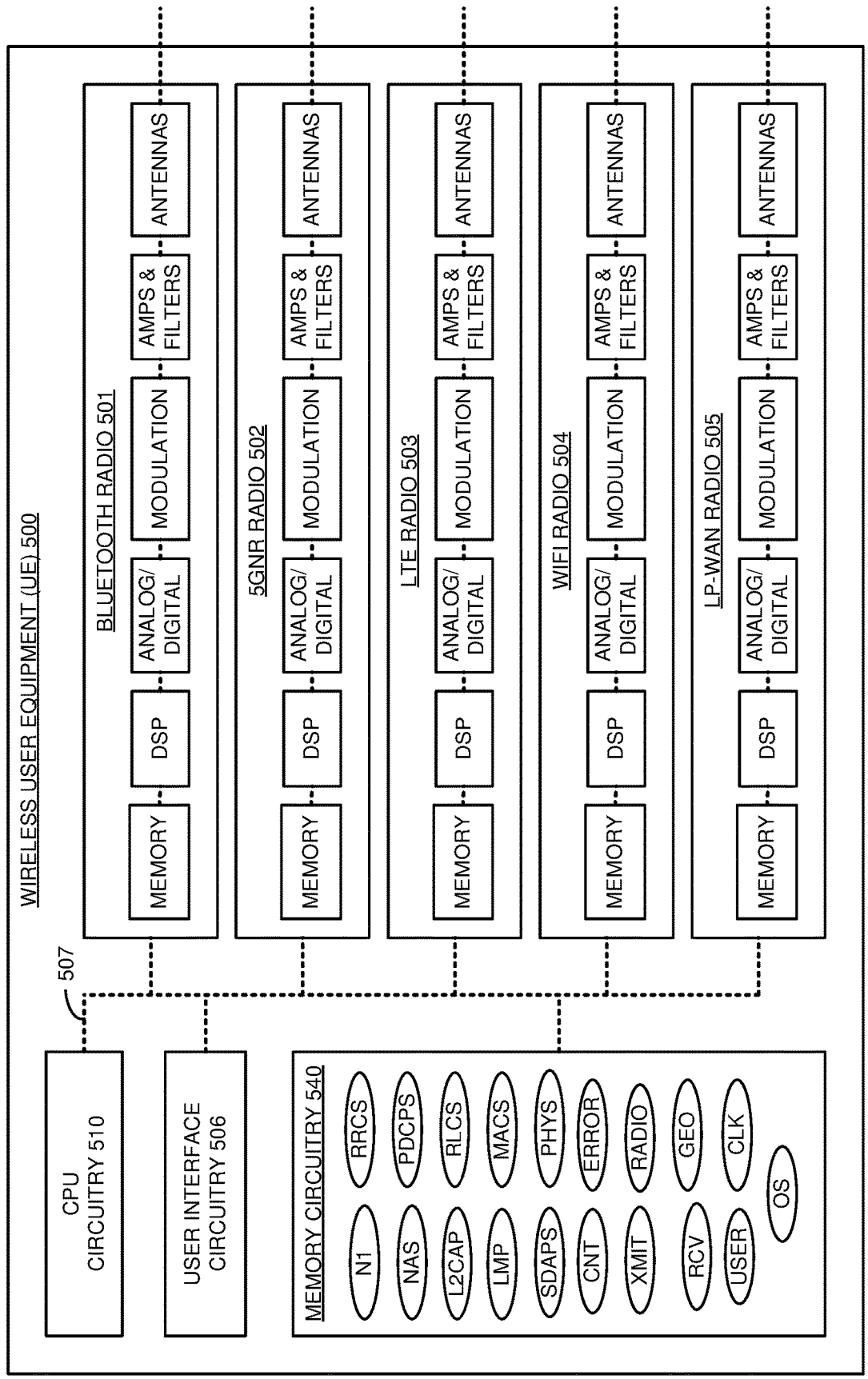
FIG. 5 illustrates a wireless UE that uses a TCP controller to deliver mobile data services and control a Bluetooth (BT) radio, Fifth Generation New Radio (5GNR) radio, Low-Power Wide Area Network (LP-WAN) radio, Long Term Evolution (LTE) radio, and Institute of Electrical and Electronic Engineers (IEEE) 802.11 (WIFI) radio.

FIG. 5 illustrates wireless UE 500 that uses TCP to deliver mobile data services and control Bluetooth (BT) radio 501, Fifth Generation New Radio (5GNR) radio 502, Low-Power Wide Area Network (LP-WAN) radio 503, Long Term Evolution (LTE) radio 504, and Institute of Electrical and Electronic Engineers (IEEE) 802.11 (WIFI) radio 505. BT wirelessly exchanges data over short distances using spectrum near 2.4 gigahertz or some other radio band that is suitable for Personal Area Networks (PANs). BT is described in IEEE and BT Special Interest Group (SIG) publications. LTE uses Orthogonal Frequency Division Multiplex (OFDM) to wirelessly exchange data with user devices like smartphones and tablets over large Wide Area Networks (WANs). LTE is described in Third Generation Partnership Project (3GPP) publications. 5GNR optimizes OFDM capabilities beyond LTE to wirelessly exchange data with more devices over a broader spectrum. 5GNR is described in 3GPP publications. LP-WAN uses low-power to wirelessly exchange low bit-rate data over long-range links. LP-WAN is described in IEEE, 3GPP, and Internet Engineering Task Force (IETF) publications. WIFI wirelessly exchanges data over moderate distances to support wireless Local Area Networks (LANs). WIFI is described in IEEE publications.

Wireless UE 500 comprises an example of wireless UE 100, although UE 100 may differ. Wireless UE 500 comprises radios 501-505, user interface circuitry 506, Central Processing Unit (CPU) circuitry 510, and memory circuitry 540 that are coupled over bus circuitry 507. Radios 501-505 comprise antennas, amplifiers (AMPS), filters, modulation, analog-to-digital interfaces, Digital Signal Processors (DSP), and memory that are coupled over bus circuitry. Radios 501-505 may share some components like antennas or memory. User interface circuitry 506 comprises audio/video components, sensors, controllers, transceivers, and/or some other user appliance circuitry.

The antennas of radios 501-505 are wirelessly linked to corresponding wireless access nodes for BT, 5GNR, LTE, LP-WAN, and WIFI. Memory circuitry 540 stores an operating system (OS), user applications (USER), and several network applications. CPU circuitry 510 executes the OS and network applications to exchange user data for the user applications in TCP packets over radios 501-505. The network applications comprise Physical Layer (PHY), Media Access Control (MAC), Radio Link Control (RLC), Packet Data Convergence Protocol (PDCP), Radio Resource Control (RRC), Service Data Adaptation Protocol (SDAP), N1, Non-Access Stratum (NAS), Logical Layer Control Adaptation Protocol (L2CAP), Link Management Protocol (LMP), Radio interface (RADIO), TCP controller (CNT), TCP transmitter (XMIT), TCP receiver (RCV), TCP error correction (ERROR), geographic module (GEO), and time module (CLK).

In radios 501-505, the antennas receive Downlink (DL) wireless signals from their corresponding wireless access nodes. The antennas transfer corresponding electrical DL signals through duplexers to the amplifiers. The amplifiers boost the received DL signals for filters which attenuate unwanted energy. In modulation, demodulators down-convert the DL signals from their carrier frequencies. The analog/digital interfaces convert the analog DL signals into digital DL signals for the DSP. The DSP recovers DL symbols from the DL digital signals. CPU circuitry 510 executes the network applications to process the DL symbols and recover the DL data. CPU circuitry 510 transfers the DL data to the user applications.

CPU circuitry 510 receives Uplink (UL) data from the user applications. CPU circuitry 510 executes the network applications to generate corresponding UL symbols. In radios 501-505, the DSPs process the UL symbols to generate corresponding digital signals for the analog-to-digital interfaces. The analog-to-digital interfaces convert the digital UL signals into analog UL signals for modulation. Modulation up-converts the UL signals to their carrier frequencies. The amplifiers boost the modulated UL signals for the filters which attenuate unwanted out-of-band energy. The filters transfer the filtered UL signals through duplexers to the antennas. The electrical UL signals drive the antennas to emit corresponding wireless signals to the wireless access nodes.

RRC functions comprise authentication, security, handover control, status reporting, Quality-of-Service (QoS), network broadcasts and pages, and network selection. SDAP functions comprise QoS marking and flow control. PDCP functions comprise security ciphering, header compression/decompression, sequence numbering/resequencing, and de-duplication. RLC functions comprise Automatic Repeat Request (ARQ), sequence numbering/resequencing, segmentation and assembly. MAC functions comprise buffer status, power control, channel quality, Hybrid Automatic Repeat Request (HARM), user identification, random access, user scheduling, and QoS delivery. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping. MINAS interact with Access and Mobility Management Functions (AMFs), Mobility Management Entities (MMEs), and possibly other network controllers to authenticate, authorize, and establish data services. L2CAP handles data multiplexing, segmentation and reassembly, multicast, and QoS. Link Management Protocol handles link establishment, device capabilities, and power control. Some additional standard network applications and functions are usually present but are omitted for clarity.

Wireless UE 500 moves around and delivers the mobile data services over radios 501-505. While at a current location, the PHYs in radios 101-105 detect and report their RSS to the TCP controller which is stored in memory circuitry 540 and is executed by CPU circuitry 510. The TCP controller qualifies radios 501-505 that have adequate RSS. The TCP controller also receives the current time from the time module and receives the current location from the geographic module. The TCP controller estimates TCP retransmission rates at the current location and time for the qualified radios. To estimate TCP retransmissions, the TCP controller tracks past TCP retransmissions by radio, location, and time. The TCP controller processes the number of past TCP retransmissions and the distance from the current location to the locations of the past TCP retransmissions. The TCP controller may then normalize, combine, and translate the amount/distance data into an estimated TCP retransmission rate. Various clustering techniques could be used to score the amount and proximity of past TCP retransmissions for a given radio and to estimate the retransmission rates based on the scores.

The TCP controller identifies individual qualified radios that have adequate TCP retransmission rate estimates. The TCP controller then selects one of the identified radios that consumes the least power. For example, radios 501-504 may be qualified by their RSS, and radios 501 and 503 may be identified by their rate estimates. The TCP controller then selects Bluetooth radio 501 over LTE radio 503, because Bluetooth radio 501 consumes less power than LTE radio 503.

The TCP controller 141 directs the TCP transmitter and TCP receiver to exchange TCP packets over the radio interface with the selected one of radios 501-505. The selected one of radios 501-505 wirelessly exchanges the TCP packets with its corresponding wireless access node. During the TCP packet exchange, the TCP error correction module detects TCP errors and directs the TCP transmitter/receiver to participate in the TCP retransmissions to correct the TCP errors. The TCP error correction module transfers resulting TCP retransmission data for the selected radio to the TCP controller. The TCP controller stores the TCP retransmission data for the selected radio in association with the current location and time. The TCP controller subsequently uses the stored TCP retransmission data to estimate TCP retransmission rates for the selected radio.

Figure 6:
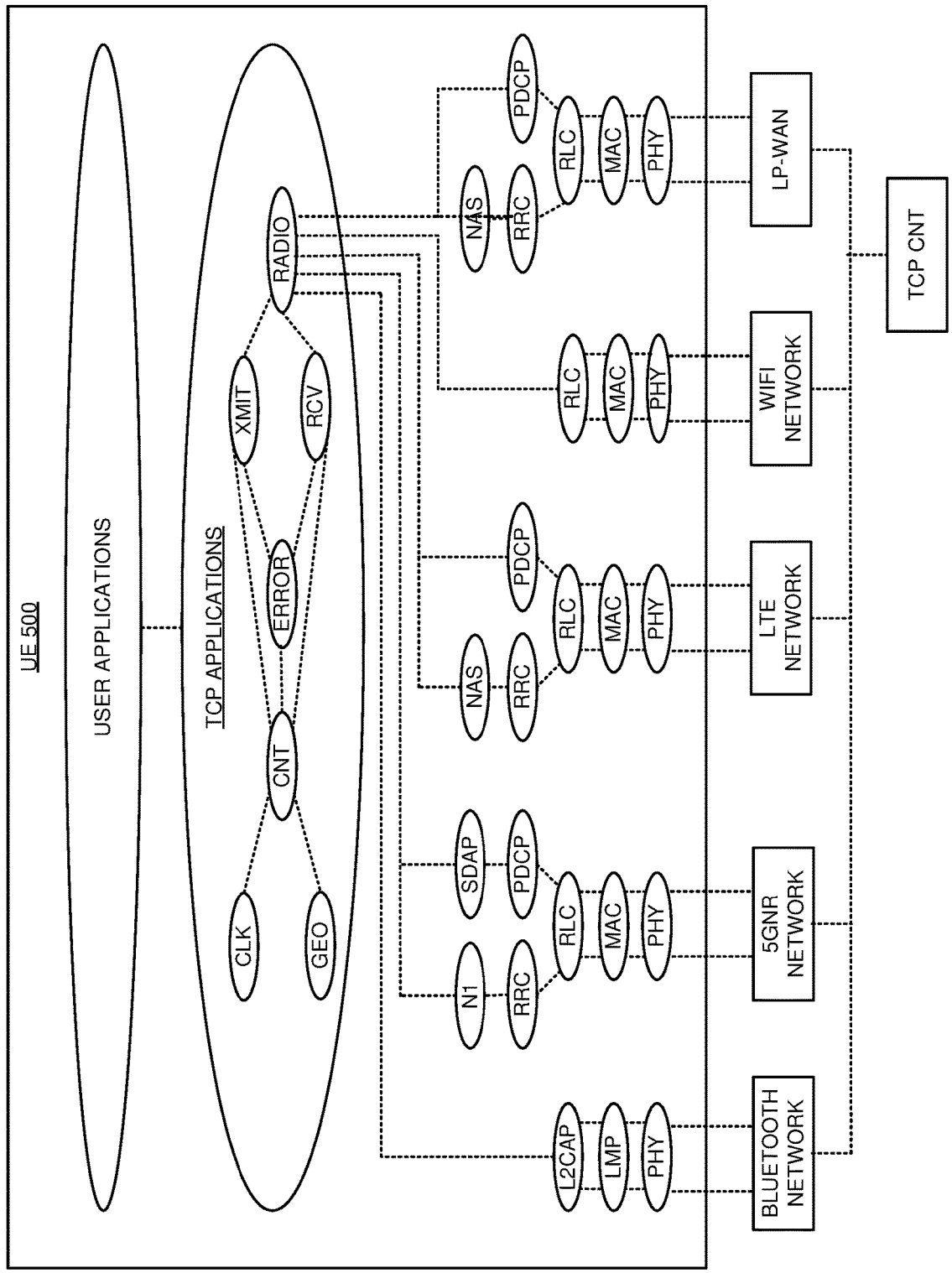
FIG. 6 illustrates the operation of the wireless UE to use the TCP controller to deliver the mobile data services and control the BT radio, 5GNR radio, LP-WAN radio, LTE radio, and WIFI radio.

FIG. 6 illustrates the operation of wireless UE 500 to use TCP to deliver the mobile data services and control the BT radio 501, 5GNR radio 502, LP-WAN radio 503, LTE radio 504, and WIFI radio 505. In the TCP applications, the TCP controller maintains a database of past TCP retransmissions for UE 500 by radio, location, and time. Wireless UE 500 receives pilot signals from the Bluetooth, 5GNR, LTE, WIFI, and LP-WAN networks. In the network applications, the PHYs process data symbols that are derived from the pilot signals to determine Received Signal Strength (RSS) from the various networks. The PHYs continually detect and transfer their current RSS to the TCP controller in the TCP applications.

The TCP controller qualifies the radios that have adequate RSS at the current location. The TCP controller also receives the current time from the time module and receives the current location from the geographic module. The TCP controller estimates the TCP retransmission rates at the current location and time for the qualified radios. To estimate the TCP retransmission rates for the qualified radios, the TCP controller processes past TCP retransmission data for the qualified radios to assess the proximity and amount of past TCP retransmissions near the current location and time. For example, the TCP controller may determine an amount of TCP retransmissions and the average distance to past TCP retransmissions for a radio and then enter a pre-configured data structure with the amount and distance to yield a TCP retransmission estimate for the radio.

The TCP controller identifies the qualified radios that also have adequate TCP retransmission rate estimates. The TCP controller then selects one of these radios based on which radio consumes the least amount of power. The TCP controller directs the TCP transmitter and TCP receiver to exchange TCP packets with the radio interface for exchange with the network applications for the selected radio. The PHYs in the network applications exchange the TCP packets with the selected radio. The selected radio wirelessly exchanges the TCP packets with a corresponding wireless network. During the TCP packet exchange, the TCP error correction module detects TCP errors and directs error recovery. The TCP transmitter and receiver participate in TCP retransmissions to correct the TCP errors. The TCP error correction module transfers resulting TCP retransmission data for the selected radio to the TCP controller. The TCP controller stores the TCP retransmission data for the selected radio in association with the current location and time. The TCP controller subsequently uses the stored TCP retransmission data to estimate TCP retransmission rates for the selected radio.

The wireless data network circuitry described above comprises computer hardware and software that form special-purpose network circuitry to select wireless radios based on their individual TCP retransmission history. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to control the network architecture of wireless mesh networks.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a User Equipment (UE) that uses Transmission Control Protocol (TCP) over radios, the method comprising:
    at past geographic locations, UE circuitry exchanging past TCP packets with the radios;
    at the past geographic locations, the radios wirelessly exchanging the past TCP packets with wireless communication nodes;
    the UE circuitry determining past TCP retransmission rates for the radios at the past geographic locations;
    at a new geographic location, the UE circuitry calculating distances between the new geographic location and the past geographic locations and determining estimated TCP retransmission rates for the radios at the new geographic location based on the past TCP retransmission rates for the radios at the past geographic locations and the distances between the new geographic location and the past geographic locations;
    the UE circuitry comparing the estimated TCP retransmission rates for the radios at the new geographic location to a rate threshold and selecting one of the radios having an estimated TCP retransmission rate below the rate threshold;
    at the new geographic location, the UE circuitry exchanging new TCP packets with the selected one of the radios; and
    at the new geographic location, the selected one of the radios wirelessly exchanging the new TCP packets with one of the wireless communication nodes.

2. The method of claim 1 further comprising:
    the radios determining received signal strengths for the wireless communication nodes at the new geographic location; and wherein:
    the UE circuitry selecting the one of the radios having the estimated TCP retransmission rate below the rate threshold comprises selecting the one of the radios having the estimated TCP retransmission rate below the rate threshold and based on the received signal strengths at the new geographic location.

3. The method of claim 1 wherein:
    the radios have power consumption levels; and
    the UE circuitry selecting the one of the radios having the estimated TCP retransmission rate below the rate threshold comprises selecting the one of the radios having the estimated TCP retransmission rate below the rate threshold and based on the power consumption levels.

4. The method of claim 1 further comprising:
    the radios determining received signal strengths at the new geographic location for the wireless communication nodes; and wherein:

the radios have power consumption levels; and the UE circuitry selecting the one of the radios having the estimated TCP retransmission rate below the rate threshold comprises selecting the one of the radios having the estimated TCP retransmission rate below the rate threshold and based on the received signal strengths at the new geographic location and the power consumption levels.

5. The method of claim 1 further comprising:

the UE circuitry determining the past TCP retransmission rates for the radios at the past geographic locations and at past times; and wherein:

the UE circuitry calculating the distances and determining the estimated TCP retransmission rates comprises the UE circuitry calculating the distances between the new geographic location and the past geographic locations, calculating time differences between a current time and the past times, and determining the estimated TCP retransmission rates for the radios at the new geographic location and the current time based on the past TCP retransmission rates for the radios at the past geographic locations and the past times, the distances between the new geographic location and the past geographic locations, and the time differences between the current time and the past times.

6. The method of claim 5 further comprising:

the UE circuitry weighting more recent ones of the past TCP retransmission rates over less recent ones of the past TCP retransmission rates; and wherein:

the UE circuitry determining estimated the TCP retransmission rates for the radios comprises the UE circuitry determining the estimated TCP retransmission rates for the radios at the new geographic location and the current time based on the weighted past TCP retransmission rates for the radios at the past geographic locations and the past times, the distances between the new geographic location and the past geographic locations, and the time differences between the current time and the past times.

7. The method of claim 1 further comprising:

the UE circuitry hosting a data structure that correlates radio suitability to user applications and entering executing ones of the user applications to the data structure;

the UE circuitry generating selection criteria for the radios that disqualifies non-suitable ones of the radios based on an output from the data structure; and wherein:

the UE circuitry selecting the one of the radios comprises the UE circuitry selecting the one of the radios having the estimated TCP retransmission rate below the rate threshold and that is not disqualified by the selection criteria.

8. The method of claim 1 further comprising:

the UE circuitry executing a TCP controller; and wherein:

the UE circuitry determining the past TCP retransmission rates comprises the executing TCP controller determining the past TCP retransmission rates for the radios at the past geographic locations;

the UE circuitry calculating the distances and determining the estimated TCP retransmission rates for the radios comprises the executing TCP controller calculating the distances and determining the estimated TCP retransmission rates for the radios at the new geographic location based on the past TCP retransmission rates for the radios at the past geographic locations and the distances between the new geographic location and the past geographic locations; and the UE circuitry comparing the estimated TCP retransmission rates and selecting the one of the radios comprises the executing TCP controller comparing the estimated TCP retransmission rates for the radios to the rate threshold and selecting the one of the radios having the estimated TCP retransmission rate below the rate threshold.

9. The method of claim 1 wherein:

the radios comprise one or more of a Bluetooth radio, a Fifth Generation New Radio (5GNR) radio, a Low-Power Wide Area Network (LP-WAN) radio, a Wireless Fidelity (WIFI) radio, or a Long Term Evolution (LTE) radio; and the UE comprises a wearable device and the wearable device comprises one of a watch, an armband, a headgear, a clothing, or a footwear.

10. A User Equipment (UE) configured to use Transmission Control Protocol (TCP) over one or more radios, the UE comprising:

radios that:
wirelessly exchange past TCP packets at past geographic locations with wireless communication nodes;

UE circuitry that:
exchanges the past TCP packets with the radios at the past geographic locations;
determines past TCP retransmission rates for the radios at the past geographic locations;
at a new geographic location, calculates distances between the new geographic location and the past geographic locations and determines estimated TCP retransmission rates for the radios at the new geographic location based on the past TCP retransmission rates for the radios at the past geographic locations and the distances between the new geographic location and the past geographic locations;
compares the estimated TCP retransmission rates for the radios at the new geographic location to a rate threshold and selects one of the radios having an estimated TCP retransmission rate below the rate threshold; and
exchanges new TCP packets with the selected one of the radios at the new geographic location; and the selected one of the radios that:
wirelessly exchange the new TCP packets at the new geographic location with one of the wireless communication nodes.

11. The UE of claim 10 wherein:

the radios further:
determine received signal strengths for the wireless communication nodes at the new geographic location; and the UE circuitry further:
selects the one of the radios having the estimated TCP retransmission rate below the rate threshold and based on the received signal strengths at the new geographic location to select the one of the radios having the estimated TCP retransmission rate below the rate threshold.

12. The UE of claim 10 wherein:

the radios comprise power consumption levels; and the UE circuitry further:
selects the one of the radios having the estimated TCP retransmission rate below the rate threshold and based on the power consumption levels to select the one of the radios having the estimated TCP retransmission rate below the rate threshold.

13. The UE of claim 10 wherein:
the radios further:
  determine received signal strengths at the new geographic location for the wireless communication nodes;
the radios comprise power consumption levels; and
the UE circuitry further:
  selects the one of the radios having the estimated TCP retransmission rate below the rate threshold and based on the received signal strengths at the new geographic location and the power consumption levels to select the one of the radios having the estimated TCP retransmission rate below the rate threshold.

14. The UE of claim 10 wherein:
the UE circuitry further:
  determines the past TCP retransmission rates for the radios at the past geographic locations and at past times;
  calculates the distances between the new geographic location and the past geographic locations, calculates time differences between a current time and the past times, and determines the estimated TCP retransmission rates for the radios at the new geographic location and the current time based on the past TCP retransmission rates for the radios at the past geographic locations and the past times, the distances between the new geographic location and the past geographic locations, and the time differences between the current time and the past times.

15. The UE of claim 14 wherein:
the UE circuitry further:
  weights more recent ones of the past TCP retransmission rates over less recent ones of the past TCP retransmission rates; and
  determines the estimated TCP retransmission rates for the radios at the new geographic location and the current time based on the weighted past TCP retransmission rates for the radios at the past geographic locations and the past times, the distances between the new geographic location and the past geographic locations, and the time differences between the current time and the past times.

16. The UE of claim 10 wherein:
the UE circuitry further:
  hosts a data structure that correlates radio suitability to user applications and enters executing ones of the user applications to the data structure;
  generates selection criteria for the radios that disqualifies non-suitable ones of the radios based on an output from the data structure; and
  selects the one of the radios having the estimated TCP retransmission rate below the rate threshold and that is not disqualified by the selection criteria.

17. The UE of claim 10 further comprising:
a TCP controller; and wherein the UE circuitry further:
  executes the TCP controller; and
the TCP controller that:
  determines the past TCP retransmission rates for the radios at the past geographic locations;
  calculates the distances and determines the estimated TCP retransmission rates for the radios at the new geographic location based on the past TCP retransmission rates for the radios at the past geographic locations and the distances between the new geographic location and the past geographic locations; and
  compares the estimated TCP retransmission rates for the radios to the rate threshold and selects the one of the radios having the estimated TCP retransmission rate below the rate threshold.

18. The UE of claim 10 wherein the radios comprise one or more of a Bluetooth radio, a Fifth Generation New Radio (5GNR) radio, a Low-Power Wide Area Network (LP-WAN) radio, a Wireless Fidelity (WIFI) radio, or a Long Term Evolution (LTE) radio.

19. The UE of claim 10 wherein the UE comprises a wearable device and the wearable device comprises one of a watch, an armband, a headgear, a clothing, or a footwear.

20. A method of operating a wireless communication network to serve a User Equipment (UE) that uses Transmission Control Protocol (TCP), the method comprising:
  wireless access nodes wirelessly broadcasting pilot signals;
  the UE wirelessly receiving the pilot signals over radios, measuring received signal strength of the pilot signals for each of the radios, and qualifying ones of the radios having a received signal strength that exceeds a strength threshold;
  the UE retrieving TCP retransmission data from memory that indicates past TCP retransmission rates at past geographic locations for the qualified radios, calculating distances between a current geographic location of the UE and the past geographic locations, and determining estimated TCP retransmission rates for the qualified radios at the current geographic location based on the past TCP retransmission rates for the radios at the past geographic locations and the distances between the current geographic location and the past geographic locations;
  the UE comparing the estimated TCP retransmission rates for the qualified radios at the current geographic location to a rate threshold and selecting one of the qualified radios having an estimated TCP retransmission rate below the rate threshold;
  the UE wirelessly exchanging TCP packets with one of the wireless access nodes using the selected one of the radios; and
  the one of the wireless access nodes exchanging the TCP packets with a network TCP controller.

\* \* \* \* \*